United States Patent [19]

Woodward

[11] Patent Number: 4,589,213
[45] Date of Patent: May 20, 1986

[54] CONDUIT BENDING LEVEL

[76] Inventor: William Woodward, 141 Crafton Ave., Pitman, N.J. 08071

[21] Appl. No.: 710,362

[22] Filed: Mar. 11, 1985

[51] Int. Cl.⁴ .................................................. G01C 9/00
[52] U.S. Cl. ........................................ 33/371; 33/343
[58] Field of Search ................ 33/370, 371, 372, 373, 33/379, 343, 351, 333

[56] References Cited

U.S. PATENT DOCUMENTS

| | | | |
|---|---|---|---|
| 2,531,563 | 11/1950 | Feldheim | 33/371 X |
| 2,541,641 | 2/1951 | Dodson | 33/373 |
| 4,394,799 | 7/1983 | Moree et al. | 33/343 |
| 4,457,078 | 7/1984 | Suchy | 33/373 X |

FOREIGN PATENT DOCUMENTS

| | | | |
|---|---|---|---|
| 431738 | 7/1926 | Fed. Rep. of Germany | 33/371 |
| 549091 | 4/1932 | Fed. Rep. of Germany | 33/334 |

*Primary Examiner*—Harry N. Haroian
*Attorney, Agent, or Firm*—Thomas A. Lennox

[57] ABSTRACT

A conduit bending level device to be attached to the front end of a conduit to maintain the vertical plane of the conduit through a series of bends including a spring yoke to slide and hold over the end of the conduit on the top with a slot to allow marking of the position, a level vial held away from the end of the conduit and a pivoting horizontal hinge to allow the vial to be moved upwardly or downwardly in a vertical direction.

6 Claims, 6 Drawing Figures

CONDUIT BENDING LEVEL

BACKGROUND OF THE INVENTION

The field of this invention involves the bending of conduit and specifically involves a device to give an indication whether the bend remains in the bending plane.

In the installation of electrical systems in commerical installations and in large buildings, it is necessary to encase the electrical wires in conduit or pipe as they are run from place to place within the building. Throughout this specification the term "conduit" is used to include not only the standard conduit, but also pipe and tubing which may be used to protect the electric lines. As the conduit is installed in the building, it is necessary to bend the conduit to avoid obstructions. A common shape is a "jog" wherein the conduit is bent in one direction and is then bent backward so that the remaining length of the conduit is pointed in the same general direction as it started, but at a different level. For the "jog" bend it is necessary to have the straight conduit before the bends and the straight conduit after the bends be in the same flat plane. Thus, both bends must be in the same bending plane or else the ends will not be extending in the same direction. Visual as well as practical considerations require that when looking down the length of conduit with multiple bends, that the bends be in a single plane. In particular, the bends must be coplanar.

Large conventional bending machines are available to form bends with planar precision but are not practical for use at the site of construction. Small plane indicators have been described but their operation is unweildly. These devices are described in the following United States Patents: U.S. Pat. Nos. 3,465,560 to Gardner, 3,396,565 to Miller, 2,932,225 to Gardner, 1,229,916 to Duncan, 2,624,118 to Anderson, 2,824,381 to Traupmann, 3,822,481 to Doan, 2,842,863 to Hellwig, 4,274,208 to Yakkel and 4,394,799 to Moree et al.

None of these devices satisfy the above needs or attain the objects described hereinbelow.

SUMMARY OF THE INVENTION

It is an object of this invention to provide a conduit bending level which may be read during the bending process irregardless of the direction of the bend and the degree of the bend.

It is an additional object of the present invention to provide a conduit bending level which is easily attached and disattached from the conduit.

It is a further object of this invention to provide a conduit bending level which may be attached to the conduit without damaging threads previously placed on the end of the conduit.

It is an additional object of the present invention to provide a conduit bending level which after being attached to the conduit is either dislodged or removed, it may be reattached in exactly the same position.

It is a particular object of the present invention to provide a conduit bending level to insure coplanar bends in the conduit.

When using the devices described in the prior art, it was found that it was almost impossible to make multiple bends in the conduit without, at one time or another, striking the level attached to the conduit. There was no ready way of determining whether the level had been moved, as even a slight canting of the device causes great inaccuracy. Even, if after striking the device, it turns out that there was little or no movement, there remains the anxiety that it may have moved during the balance of the bending process. Further, and most importantly, the devices operate satisfactorily before the bend, but are almost impossible to read during the first bend or at the start or during the second bend. The level is positioned and angled such that it is almost impossible to observe. Thus, the reason for the device, to check and maintain the level position is inhibited by the very structure of the device and the bending operation.

The conduit bending level of the present invention is constructed to attach to the end of the conduit to allow maintenance of the plane of the conduit through a series of bends. A device includes a body member having a front end attachable proximate to the end of the conduit and a rear end positionable on top of the conduit. An attachment device is provided to detachably attach the body member to the end of the conduit. This attachment device preferably includes a yoke of a spring member extending from the front end of the body member to the rear end and exerting upward pressure towards the bottom surface of the body member. A vial holding member holds a level vial cross-wise of the center line of the conduit. A pivot device attaches the vial holding member to the body member allowing the vial to be pivoted upwardly or downwardly in a single vertical arc.

DESCRIPTION OF THE PREFERRED EMBODIMENTS

The body member is preferably a sheet member positioned to extend over and abut the top of the conduit and is preferably curved concave downwardly to abut the surface of the conduit. It is preferred that the body member include a slot through the member extending from the rear end along the length of the body member toward the front end of the size and shape to allow a mark to be affixed on the top of the conduit. Thus, when the device is first attached and a level condition determined, a mark is placed on the conduit through the slot. Then, whenever the level condition is checked, the operator can be assured that the device is exactly in the same position it was when originally installed before the bending process was begun. It is preferred that the attachment device include at least on magnet attached to either the body member or the attachment device positioned to abut and attach to the conduit surface. It is preferred that there be two strip magnets attached to the body member near the rear end of the body member. It is preferred that the vial holding member be a "C" shaped member with the ends interconnecting to the pivot device and the level vial fixed to the middle of the member. In this fashion, the level vial is positioned away from the end of the conduit and may be rotated upwardly or downwardly to view the level condition. The pivot device is preferably a horizontal hinge connecting the vial holding member to the front end of the body member.

The device may also be described as a conduit bending level including a body member having a front end and a rear end with a longitudinal axis. The vial holding member holds the vial on an axis transverse to the longitudinal axis of the body. The pivot device allows the vial to be positioned upwardly or downwardly, but always transverse to the longitudinal axis.

Figure 1:
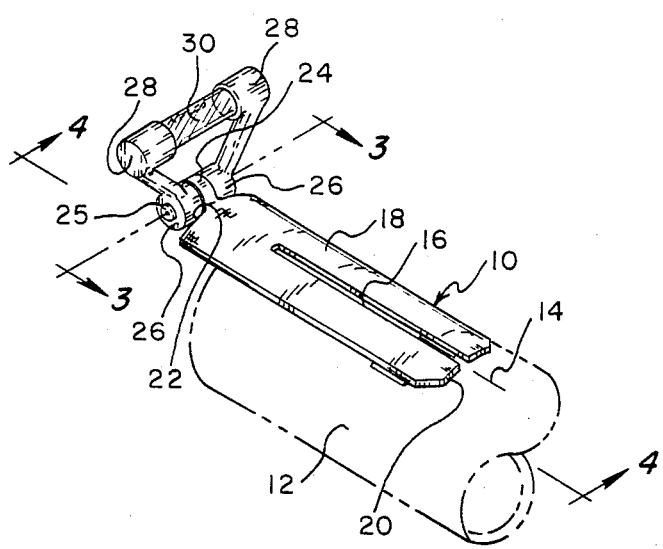
FIG. 1 is a perspective view of a conduit bending level of the present invention shown attached to a conduit.
Figure 2:
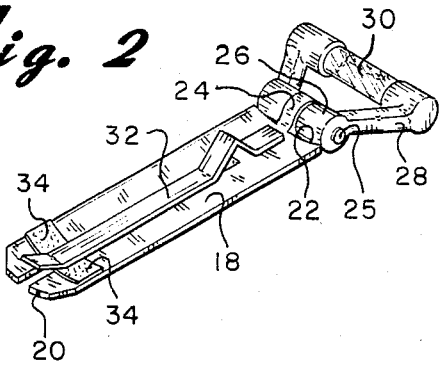
FIG. 2 is a perspective view showing the level removed from the conduit and turned over to display the bottom area.

In FIG. 1 conduit bending level device 10 is shown attached to conduit 12, generally positioned on top of the conduit. When a level condition is determined, line 14 is drawn on the surface of the conduit through slot 16. As illustrated, line 14 is not shown extending into slot 16 to avoid confusion. Device 10 is constructed with body 18 which is a sheet member bent in a cylindrical plane concave downwardly to abut the surface of conduit 12. Slot 16 is cut from rear end 20 of body 18 toward front end 22, but need not reach that end and may be of shorter length than that illustrated in FIG. 1. Connected to front end 22 is hinge member 24 from which horizontal pivot pin 25 extends in both directions from member 24. Holding ends 26 of "C" shaped vial holding member 28 pivot on pin 25 upwardly and downwardly in an arc centered at pin 25. Level vial 30 is attached to and is part of holder 28 to allow reading the level condition at any position of vial holder 28. In order to obtain accurate level readings, multiple level vials may be included in the position of level vial 30. Thus, two or three level vials may be positioned to read level at any position of vial holder 28. An interlocking device, such as detents, allow ends 26 to hold in any chosen position on pin 25 so that vial holder 28 will hold in any position it is set. In FIG. 2, conduit bending level 10 is shown inverted and removed from conduit 12 and with vial holding member 28 angled roughly in the same plane as body 18. Spring member 32 is structurally welded to body member 18 and extends from end 22 backward along the underside of the body 18 toward the rear end 20 exerting pressure against that underside to trap and hold device 10 on conduit 12. Sheet magnets 34 are adhesively attached to the underside of body 18 and provide attachment support as they abut and attach to the metal surface of conduit 12. Body 18, hinge shape 24 and spring member 32 may be constructed of a single piece of metal.

Figure 3:
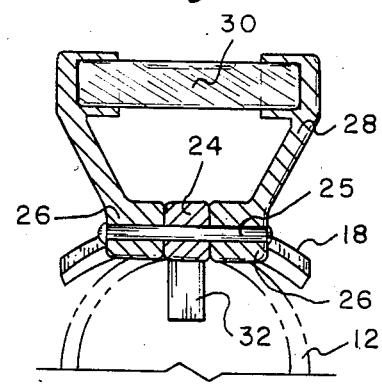
FIG. 3 is a cross-sectional view taken along lines 3—3 of FIG. 1.

The cross-sectional view of FIG. 3 illustrates pin 25 passing through and fixed permanently in member 24 with ends 26 of holder 28 pivoting to position vial 30. On the surfaces of pin 25 and in the holes through ends 26 are located detent interlocking means to allow holder 28 to hold any position in which it is placed.

Figure 4:
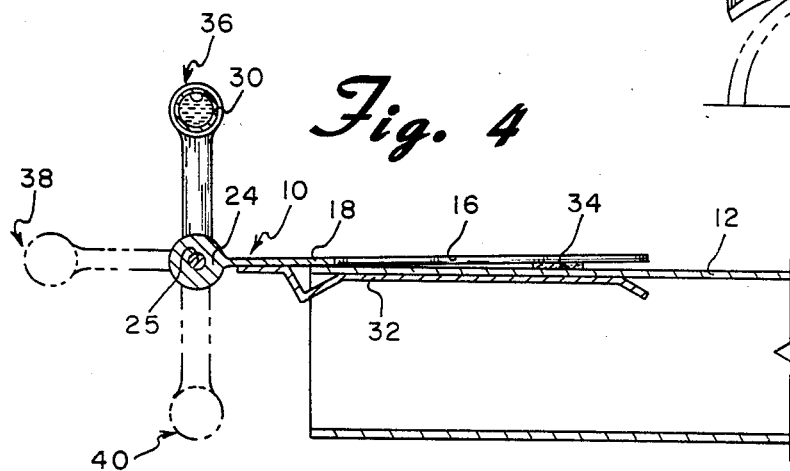
FIG. 4 is a cross-sectional view taken along lines 4—4 of FIG. 1.

As illustrated in the cross-sectional view of FIG. 4, device 10 is shown detachably attached to conduit 12. Various positions of level vial 30 are illustrated wherein the vial may be positioned upwardly in position 36, horizontally in position 38, or downwardly in position 40 to allow reading of the level condition of the conduit irregardless of the bend.

Figure 5:
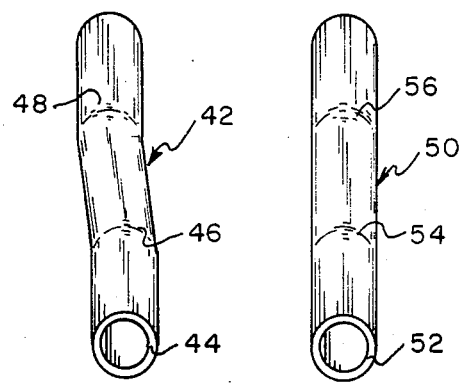
FIG. 5 is a perspective view looking downwardly and from the end of the two conduits, one with a "dog leg" and the other with coplanar bends.

If FIG. 5, conduit 42 is shown as viewed from above and from end 44 illustrating a bend upwardly and then back to the horizontal at bend 48. As illustrated, bend 46 is not coplanar to bend 48 so that the section of conduit 42 between bend 46 and 48 is canted to the side yielding a poor appearance and poor performance of the conduit. Conduit 50, on the other hand, has been bent properly and as viewed from end 52 along the length of the conduit, bend 54 upwardly and bend 56 back to a horizontal direction are coplanar.

Figure 6:
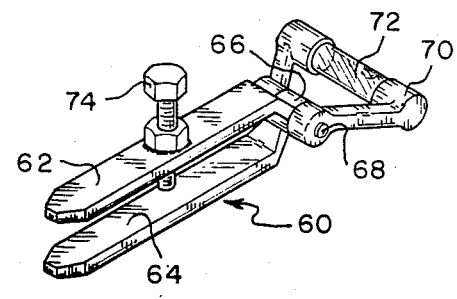
FIG. 6 is a perspective view of another conduit bending level of the present invention.

Conduit bending level device 60 is illustrated in FIG. 6 wherein the attachment device is a yoke having upper yoke member 62 and lower member 64 structurally attached to hinge member 66 from which pins 68 extend. Pivoting holder 70 pivots on pins 68 to position level vial 72 in various positions. Attachment bolt 74 is threaded through body member 62 and firmly holds device 60 to the conduit.

While this invention has been described with reference to the specific embodiments disclosed herein, it is not confined to the details set forth and the patent is intended to include modifications and changes which may come within and extend from the following claims.

I claim:

1. A conduit bending device to attach to the end of a conduit to maintain the plane of the conduit through a series of bends, comprising:
    (a) a body member having a front end positionable proximate to the end of the conduit, a rear end positionable on the top of the conduit, and a slot through the member extending from the rear end along the length of the body member toward the front end of a size and shape to allow a mark to be affixed on the top of the conduit,
    (b) attachment means to detachably attach the body member to the end of the conduit,
    (c) a level vial,
    (d) a vial holding member means to hold the vial transverse of the center line of the conduit, and
    (e) a pivot means attaching the vial holding member means to the body member and allowing the vial to be pivoted upwardly or downwardly in a single radial plane.

2. The device of claim 1 wherein the body member is curved concave downwardly to abut the surface of the conduit.

3. The device of claim 1 wherein the vial holding member is "C" shaped member with the ends interconnecting to the pivot means and the level vial fixed to the middle of the member.

4. The device of claim 1 wherein the pivot means is a horizontal hinge pin at the front end of the body member.

5. A conduit bending device to attach to the end of a conduit to maintain the plane of the conduit through a series of bends, comprising:
    (a) a body member having a front end positionable proximate to the end of the conduit, a rear end positionable on the top of the conduit attachment means to detachably attach the body member to the end of the conduit, said attachment means comprising a yoke of a spring member extending from the front end of the body member toward the rear end and exerting upward pressure towards a bottom surface of the body member,
    (c) a level vial,
    (d) a vial holding member means to hold the vial transverse of the center line of the conduit, and
    (e) a pivot means attaching the vial holding member means to the body member and allowing the vial to be pivoted upwardly or downwardly in a single radial plane.

6. The device of claim 5 wherein the attachment means comprises at least one magnet attached to the bottom surface to abut and attach to the conduit surface.

* * * * *